J. H. Parker,
Truss Spring.
N⁰ 52,002.   Patented Jan. 9, 1866.
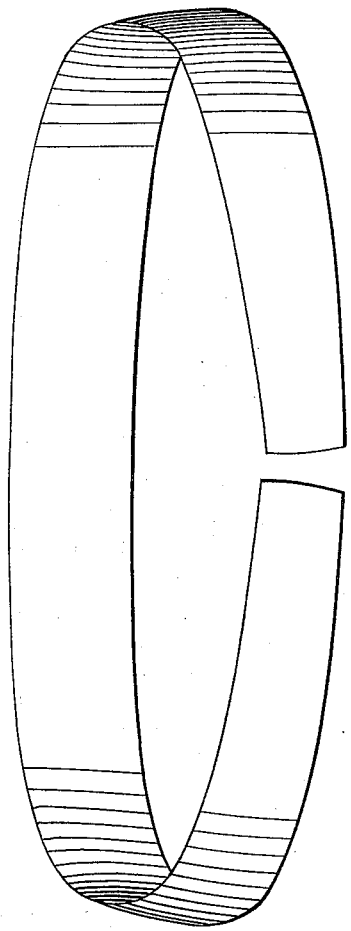
Witnesses:
Inventor:
J. H. Parker

UNITED STATES PATENT OFFICE.

JAMES H. PARKER, OF TRENTON, ASSIGNOR TO HIMSELF, JAMES T. HALL, AND ISAAC PIERCE, OF FLOYD, NEW YORK.

IMPROVEMENT IN SPRINGS FOR TRUSSES.

Specification forming part of Letters Patent No. 52,002, dated January 9, 1866.

*To all whom it may concern:*

Be it known that I, JAMES H. PARKER, of the town of Trenton, county of Oneida and State of New York, have invented a new and useful Application of Vulcanized Rubber or Gutta-Percha in the Manufacture of Truss or Supporter Springs; and I do hereby declare that the following is a full and exact description of the same, reference being had to the annexed drawing, making a part of this specification.

The nature of my invention consists in making a truss or supporter spring which will, by being heated, adjust itself to the form of the parts to which it is applied, said truss or supporter spring being made entirely of vulcanized rubber or gutta-percha, as hereinafter described.

To enable others skilled in the art to make and use my invention, I will proceed to describe its construction and operation.

I construct my improved truss or supporter spring entirely of vulcanized rubber or gutta-percha, and make it in the form shown in the accompanying drawing, and attach thereto the ordinary appendages—to wit, straps, pads, &c., the construction of which is well understood.

In applying my improved truss or supporter spring to the part of the body requiring it, I heat said truss or supporter spring until it becomes very pliant, and in this soft or pliable condition I arrange and fit it to the desired part or parts of the body, and when its temperature becomes lowered to that of the body it will become set and perfectly fitted to the parts to which it is applied.

I wish it clearly understood that I do not claim, broadly, the use of vulcanized rubber or gutta-percha in the construction of a truss or a supporter spring; but What I do claim as of my invention is—

A truss or supporter spring which will become pliable by heat and adjust itself to the form of the part of the body to which it is applied, said truss or supporter spring being made entirely of vulcanized rubber or gutta-percha, substantially as herein described and set forth.

J. H. PARKER. [L. S.]

Witnesses:
 WM. DENT,
 ROBT. DENT.